United States Patent
Goetz et al.

(10) Patent No.: US 11,410,215 B1
(45) Date of Patent: Aug. 9, 2022

(54) ELECTRONIC LAYAWAY

(71) Applicant: Wells Fargo Bank, N.A., San Francisco, CA (US)

(72) Inventors: Darren M. Goetz, Salinas, CA (US); Dennis E. Montenegro, Concord, CA (US); Alicia Y. Moore, San Ramon, CA (US); Timothy R. Ward, Mesa, AZ (US)

(73) Assignee: Wells Fargo Bank, N.A., San Francisco, CA (US)

( * ) Notice: Subject to any disclaimer, the term of this patent is extended or adjusted under 35 U.S.C. 154(b) by 1 day.

(21) Appl. No.: 16/656,457

(22) Filed: Oct. 17, 2019

(51) Int. Cl.
| | |
|---|---|
| G06Q 30/00 | (2012.01) |
| G06Q 30/06 | (2012.01) |
| G06Q 40/02 | (2012.01) |
| G06Q 20/10 | (2012.01) |

(52) U.S. Cl.
CPC ......... *G06Q 30/0613* (2013.01); *G06Q 20/10* (2013.01); *G06Q 30/0607* (2013.01); *G06Q 30/0609* (2013.01); *G06Q 40/02* (2013.01)

(58) Field of Classification Search
CPC ............... G06Q 30/0613; G06Q 20/10; G06Q 30/0607; G06Q 30/0609
See application file for complete search history.

(56) References Cited

U.S. PATENT DOCUMENTS

| | | | | |
|---|---|---|---|---|
| 8,612,349 | B1* | 12/2013 | Ledder | G06Q 40/02 705/42 |
| 9,010,635 | B2 | 4/2015 | Argue et al. | |
| 2002/0082994 | A1* | 6/2002 | Herziger | G07F 19/20 705/43 |
| 2010/0138287 | A1* | 6/2010 | Hoque | G06Q 30/04 705/14.25 |
| 2011/0004514 | A1 | 1/2011 | Thomas | |
| 2012/0046958 | A1 | 2/2012 | Pynadath et al. | |
| 2012/0109819 | A1 | 5/2012 | Aidoo | |
| 2014/0019283 | A1 | 1/2014 | Daley | |
| 2014/0101012 | A1 | 4/2014 | Kuznetsov | |
| 2014/0117079 | A1 | 5/2014 | Argue et al. | |
| 2014/0122269 | A1 | 5/2014 | Argue et al. | |
| 2014/0141866 | A1 | 5/2014 | Irwin et al. | |
| 2014/0278609 | A1* | 9/2014 | Capps | G06Q 20/14 705/5 |
| 2014/0344105 | A1 | 11/2014 | Liu | |

(Continued)

OTHER PUBLICATIONS

Dimitrov, Stanko, and Oben Ceryan. "Optimal inventory decisions when offering layaway." International Journal of Production Research 57.4 (2019): 1161-1175.*

*Primary Examiner* — Kathleen Palavecino
(74) *Attorney, Agent, or Firm* — Foley & Lardner LLP

(57) ABSTRACT

The present disclosure describes devices and methods for facilitating specific transactions between a seller and a purchaser. In particular, a computing device an accounts circuit, accounts database, and a network interface is disclosed. In some embodiments, the specific transaction is a layaway transaction. The computing device receives a request to facilitate the transaction between the seller and purchaser. The computing device then sets up a transient account for the transaction, facilitates funding of the account, and finalizes the transaction in response to a condition being met.

18 Claims, 8 Drawing Sheets

(56) References Cited

U.S. PATENT DOCUMENTS

| | | |
|---|---|---|
| 2015/0026037 A1* | 1/2015 | Thompson ............ G06Q 40/025 |
| | | 705/38 |
| 2016/0034875 A1 | 2/2016 | Stevens et al. |
| 2016/0125408 A1 | 5/2016 | Crawford |
| 2017/0169513 A1 | 6/2017 | Perelman |
| 2017/0200224 A1 | 7/2017 | Zeringue |
| 2017/0255900 A1* | 9/2017 | High .................... G06Q 10/087 |
| 2018/0349903 A1 | 12/2018 | Crawford |
| 2021/0097513 A1* | 4/2021 | Nicholson .......... G06Q 20/3224 |

* cited by examiner

ELECTRONIC LAYAWAY

BACKGROUND

Many customers look for more from their financial institutions than simply holding their money. For example, customers may need real-time support and assistance when making purchases. Without improved computing systems many customers cannot receive the assistance and support that a financial institution may be able to provide. This is particularly true in cases where a customer chooses to enter into layaway contracts. For example, the customer may want to make a purchase using a layaway purchase method. However, there is not a way that a financial institution can help the customer achieve making the purchase via the layaway method. merchant

SUMMARY

Various embodiments disclosed herein are related to a computing system for facilitating specific transactions between a purchaser and a seller. In some embodiments, a processor of the computing system performs a method of facilitating transactions between a seller and a purchaser. In some embodiments, the transaction is a layaway transaction. The method performed by the processor may include, receiving an initiation request related to the transaction, automatically facilitating initiation of an account for the transaction that is unique to the transaction, facilitating funding of the account, and finalizing the transaction in response to a condition being met. In some embodiments, the request includes information about the purchaser, information about the transaction (e.g., a down payment amount, a total amount, a goal, a payment schedule, rules etc.), and a final date of the transaction. In some embodiments, the account is a transient (e.g., escrow) account. In some embodiments, the transaction is finalized in response to the final date being met. In some embodiments, the transaction is finalized in response to an amount of funds in the account meeting or exceeding a goal of the transaction.

In another implementation, a provider computing system includes an accounts database and a processor and program logic stored in memory and executed by the processor, the program logic including electronic layaway logic configured to receive an initiation request related to a layaway transaction, wherein the initiation request comprises information associated with the transaction, information associated with a user, and a final date, in response to receiving the initiation request, the automatically facilitate initiation of an account, where the account is unique to the transaction, facilitate funding of the account, and finalize the transaction by releasing funds in response to a condition being met. Facilitating initiation of the account includes determining that the user has a customer profile in the accounts database and automatically associating the account with the customer profile. In some embodiments, facilitating funding of the account includes providing funding options to a graphical user interface, receiving funding preferences based on selections on the graphical user interface, receiving funds for the account, and in response to receiving the funds, automatically allocating the funds to the user account. In some embodiments, the condition is that the funds in the account are equal to a goal of the layaway transaction. In some embodiments, finalizing the transaction includes closing the account after all funds in the account have been removed.

In another implementation, a system may include a graphical user interface (GUI), a processor and program logic stored in memory and executed by the processor, the program logic including environmental risk level determination logic configured to receive an initiation request related to a transaction, where the initiation request comprises transaction information, user information, and a final date, in response to receiving the initiation request, automatically facilitating initiation of an account, where the account is unique to the transaction and includes rules governing the deposits and withdrawals of the account, facilitate funding of the account, and finalize the transaction by releasing funds. Facilitating funding of the account may include receiving funding preferences via the GUI, facilitating the funding preferences; and allocating received funds to the account.

BRIEF DESCRIPTION OF THE DRAWINGS

The foregoing and additional features of the present disclosure will become more apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

Figure 1:
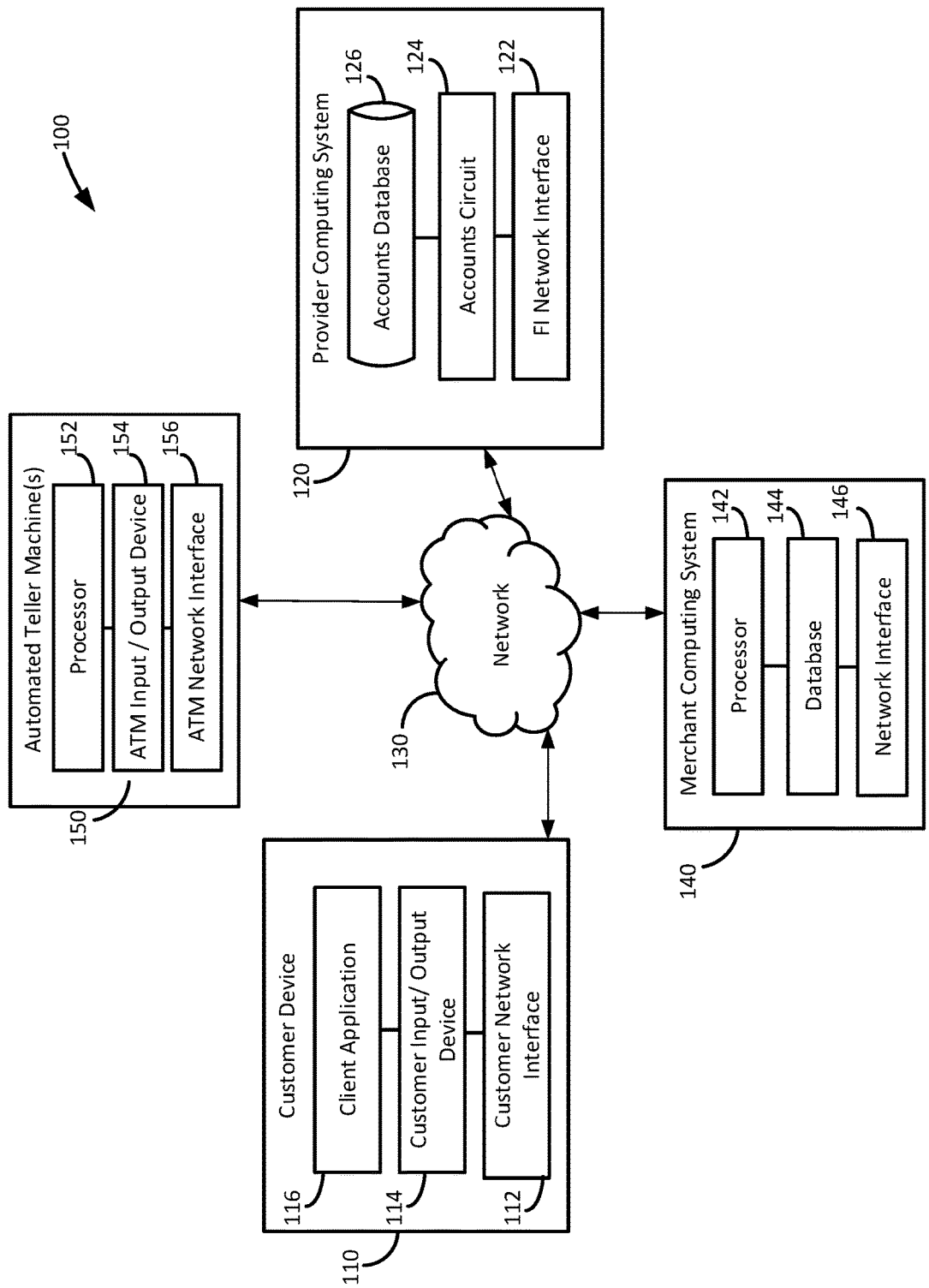
FIG. 1 depicts a layaway system in accordance with an illustrative embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Before turning to the Figures, which illustrate example embodiments, it should be understood that this application is not limited to the details or methodology set forth in the following description or illustrated in the figures. It should also be understood that the phraseology and terminology employed herein is for the purpose of description only and should not be regarded as limiting.

Various embodiments discussed herein relate to systems and methods for providing an improved computing system capable of facilitating specific transactions between a merchant and a user. In some embodiments, the specific transaction is a layaway transaction. A "layaway transaction" is an agreement between a seller and a purchaser in which the seller reserves an item for the purchaser until the purchaser completes all the payments necessary (e.g., until the total price of the item is paid). In some embodiments, a processor associated with the seller (e.g., merchant) is connected to a processor of a provider (e.g., a financial institution). The connection between the seller computing systems and the provider computing system may be made via an application programming interface (API) facilitated by a network. In some embodiments, the network is the Internet. In some embodiments, the network is an internal or private network. Further, a processor of the provider may be connected to a variety of devices. In some embodiments, the devices include customer devices, automated teller machines (ATMs), registration terminals at a merchant, and/or provider terminals (e.g., desktop or laptop computers owned by the provider). The connection between the provider computing system and the variety of devices may also be facilitated by the network.

In an example embodiment, the merchant computing system transmits a request to facilitate a layaway transaction to the provider computing system. The provider computing system receives the request and information associated with the request. For example, the information may include a name of the purchaser (i.e., user), social security number of the user, an amount of the layaway transaction, an amount already paid by the user, and/or a final date. The provider computing system then automatically reacts to receiving the request by initiating or creating an account for the transaction. In some embodiments, the account may be an escrow account or a transient account. The financial computing system then automatically associates the user with the account and provides the user with a notification that the account has been set up.

The provider computing system may then facilitate funding of the account. For example, in some embodiments, the provider computing system may provide a customer device application that may be downloaded onto a customer device. The customer device application may include a dashboard that displays (e.g., graphically, tabular, or otherwise) the progress of the user and provides the user with a plurality of options for funding. The user may select one or more of the options for funding and the financial computing system may then receive the selection options for funding and facilitate performance of the user's selected funding options. The provider computing system may then receive funds from various sources and allocate the funds to the account.

The provider computing system may then facilitate the completion (i.e., finalizing) of the transaction, as well as the termination of the temporary account used to facilitate the layaway transaction. For example, the termination of the account may be at a certain date, when the provider computing system determines that the funds in the account are equal or exceed the amount of the transaction, or when the provider computing system receives a termination request. In one embodiment, the provider computing system notifies (e.g., via sending an automatically generated notification) the user and the merchant that the ending point of the account has been reached. The provider computing system may then receive instructions from the user (e.g., via the customer device) and/or the merchant (e.g., via the merchant computing system). The provider computing system may then facilitate the transfer of funds in the account. For example, if the transaction was unsuccessful, the provider computing system may transfer the balance of the account to a checking account of the user. In another example, if the transaction was successful, the provider computing system may generate and send a confirmation notification to the merchant and the purchaser that the purchaser may receive the purchased item and automatically transfer the funds of the account to the merchant or account of the merchant. As such, the systems and methods herein provide a unique platform capable of facilitating transactions between sellers and purchasers. Technically and advantageously, such a process enables sellers to provide layaway services via the provider, enables purchasers the ability to manage layaway accounts, provides the purchasers with a unique and useful methods of funding layaway accounts, and eases friction between the purchaser and seller throughout the layaway process. That is, the electronic layaway system provides an improved computing platform that allows flexibility, reliability, and security to both the seller and purchaser during a layaway transaction. In some embodiments, the purchaser may be a customer of the provider of the computing platform. In some embodiments, the purchaser may not be a customer of the provider of the computing platform. In this way, the computing platform enables customers that are underbanked or do not have a bank to access options such as electronic layaway transactions.

FIG. 1 depicts a layaway system 100 in accordance with an illustrative embodiment. The layaway system 100 includes a provider computing system 120, a merchant computing system 140, and a plurality of other devices. In some embodiments, the devices may include a customer device 110 and one or more ATMs 150. In some embodiments, devices may include more than one customer device 110. In some embodiments, the one or more ATMs 150 may be provided by the provider, provided by other providers, or provided by a combination thereof. The provider (e.g., provider institution) may include commercial or private banks, credit unions, investment brokerages or the like. The various components of the layaway system 100 are configured to communicate with one another over a network 130. The network 130 is a data exchange medium, which may include wireless networks (e.g., cellular networks, Bluetooth®, WiFi, Zigbee®, etc.), wired networks (e.g, Ethernet, DSL, cable, fiber-based), or a combination thereof. In some embodiments, the network includes the Internet. As described herein, the layaway system 100 may be used to set up a user account, set up a retail account, facilitate a transaction electronically, and facilitate electronic layaway transactions.

The customer device 110 is a computing device associated with the customer. In various embodiments, the customer may utilize the customer device 110 to register for accounts at the provider, view various graphical user interfaces containing information pertaining to the customer's accounts, and facilitate funding of accounts for specific transactions. Examples of the customer device 110 include, for example, personal computing devices such as a desktop or a laptop computer, and mobile computing devices such as smartphones, tablets, and wearable computing devices, such as smartwatches and the like.

In the example shown, the customer device 110 includes a customer network interface 112 configured to communicate data over the network 130, a customer input/output (I/O) device 114, and a provider client application 116. The customer I/O device 114 includes hardware and associated logics configured to enable the customer device 110 to exchange information with a customer (e.g., via a touch display, microphone, camera) and other devices. The customer I/O device 114 may include systems, components, devices, and apparatuses that serve both input and output functions, configured to exchange information with external systems (e.g., merchant point of sale devices, computing devices associated with other individuals). Such systems, components, devices and apparatuses include, for example, radio frequency transceivers (e.g., RF or NFC-based transceivers) and other short range wireless transceivers (e.g., Bluetooth®, laser-based data transmitters).

The provider client application 116 is structured to enable the provider to establish and manage financial accounts for customers. Accordingly, the provider client application 116 is communicably coupled via the customer network interface 112 over the network 130 to the provider computing system 120. In some embodiments, the provider client application 116 includes a circuit embodied within the customer device 110. For example, the provider client application 116 may include program logic stored in a system memory of the customer device 110. In such arrangements, the program logic may configure a processor of the customer device 110 to present the user with various graphical user interfaces based on information regarding customer accounts. In some embodiments, the processor and program logic stored in memory and executed by the processor include electronic layaway logic configured to perform the steps described herein. In some embodiments, the provider client application 116 is at least partly web-based. As will be understood, the level of functionality that resides on the customer device 110 versus the provider computing system 120 will vary depending on the implementation. In some embodiments, the displays presented to the customer via the provider client application 116 are configured to receive information from the customer to then further communicate the received information to the provider computing system 120.

In some embodiments, the provider client application 116 includes program logic configured to cause the customer device 110 to process and manipulate customer financial data received from the provider computing system 120 over the network 130. For example, in response to funds being deposited into the customer's transaction account, the provider computing system 120 may transmit updated account balance information to the customer device 110.

In some embodiments, the customer device 110 includes a mobile wallet application (not shown) structured to facilitate and permit payments by interfacing with various accounts held by the customer (e.g., including accounts established via the provider client application 116). The mobile wallet provider client application is structured to permit the customer to engage in transactions via communication with, for example, a merchant point of sale ("POS") device (or ATM 150) via an established communication channel (e.g., near field communications) in accordance with any known standard.

The provider computing system 120 is a computing system associated with the provider configured to establish and maintain customer accounts. In the example shown, the provider computing system 120 includes a network interface 122 configured to communicate data over the network 130, an account management circuit 124, and an accounts database 126. The accounts database 126 is structured to retrievably store information pertaining to accounts held by a number of customers at the provider. The accounts database 126 may include non-transient data storage mediums (e.g., local disc or flash-based hard drives, local network servers) or remote data storage facilities (e.g., cloud servers). The accounts database 126 may include personal customer information (e.g., names, addresses, phone numbers), identification information (e.g., driver's license numbers, standard biometric data), and customer financial information (e.g., token information, account numbers, account balances, available credit, credit history, transaction histories).

The accounts circuit 124 is configured to create, hold or store, and manage the financial accounts (e.g., checking accounts, transient accounts, transaction accounts, escrow accounts, etc.) of various customers. In some instances, such management includes maintaining and handling transaction processing for various customer accounts. In some embodiments, the provider client application 116 is at least partly provided by the accounts circuit 124. In this regard, the accounts circuit 124 is configured to communicate information utilized by the customer device 110 to render the various interfaces described herein to the customer. Such information may include, for example, customer account balance information, information regarding customer deposits into the accounts, information regarding third party deposits into the accounts, account balance goals, due dates, etc. For example, in some embodiments, the account circuit 124 performs the operations discussed above and herein with respect to the customer device 110 and/or application 116 to allocate funds into an account associated with a transaction. In this regard, it should be understood that the activities, operations, and functions described herein with respect to the account circuit 124 or application 116 may be performed by the other of the circuit 124 and application 116 in other embodiments. Therefore, describing the activities of these devices is meant to be exemplary only and not limiting.

The merchant computing system 140 is a computing system associated with a merchant that is configured to manage the systems associated with the merchant. In the example shown, the merchant computing system 140 includes a network interface 146 configured to communicate data over the network 130, an account management circuit 142, and a database 144. In general, the merchant computing system 140 is configured to receive inputs via the internal network of the merchant computing system 140. For example, the merchant computing system 140 may receive information from a cash register located at the merchant-merchant's store, a computer located at the merchant's store, a registration terminal at the merchant's store, a website associated with the merchant being displayed on a device, etc. The merchant computing system 140 may communicate with the provider computing system 120 via the network interface 146, network 130, and FI network interface 122.

In the example shown, the automated teller machine (ATM) 150 includes an ATM network interface 156 configured to communicate data over the network 130, an ATM I/O device 154, and a processor 152. The ATM I/O device 154 includes hardware and associated logic configured to enable the ATM 150 to exchange information with a user (e.g., via a touch display, microphone, camera) and other devices (e.g., cash depository, check depository, cash withdrawal interfaces). The ATM I/O device 114 may include systems, components, devices, and apparatuses that serve both input and output functions, configured to exchange information with external systems. Such systems, components, devices and apparatuses include, for example, radio frequency transceivers (e.g., RF or NFC-based transceivers) and other short range wireless transceivers (e.g., Bluetooth®, laser-based data transmitters).

Figure 2:
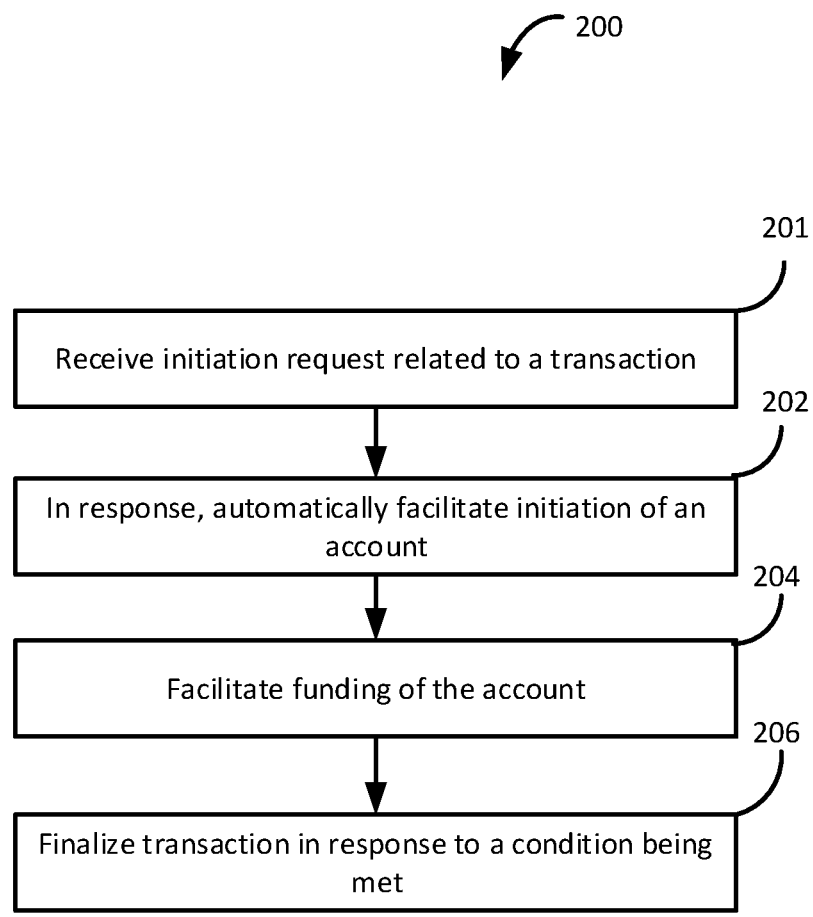
FIG. 2 depicts a method of facilitating electronic layaway transactions in accordance with an illustrative embodiment.

FIG. 2 depicts a flow diagram of a method 200 of facilitating an electronic layaway transaction in accordance with an illustrative embodiment. The method 200 may be performed by the components of FIG. 1 such that reference may be made to one or more components of FIG. 1 in order to aid description of the method 200. In various embodiments, method 200 may be executed to facilitate an electronic layaway transaction between a purchaser and a seller.

The provider computing system 120 receives a request to initiate a transaction at step 201. For example, in some embodiments, a seller (e.g., a merchant) may receive a request from a purchaser (i.e., a user) to purchase an item via the layaway method. The merchant computing system 140 may then forward the request to purchase the item (and information related to the request) to the provider computing system 120 via the network 130. In some embodiments, the purchaser requests to purchase the item via a website of the merchant that was accessed on the customer device 110. In some embodiments, the purchaser requests to purchase the item directly to an employee at a brick-and-mortar location associated with the merchant. For example, the employee may enter into the merchant computing system 140 (e.g., via a cash register, or other terminal associated with the merchant) the request for the purchase of the item. In another example, the purchaser may make the request online to purchase the item online and the customer device 110 may directly transmit the request to the provider computing system 120. In some embodiments, the request includes information regarding the purchaser (e.g., social security number, birth date, name, phone number, address), information regarding the transaction (e.g., item description, item cost, fees associated with the layaway transaction, amount of down payment made by the customer, a final date by which the transaction must be completed), and merchant information (e.g., name of merchant, accounts of merchant, address of merchant).

The provider computing system 120 responds to the initiation request related to the transaction by automatically facilitating initiation of an account at step 202. In some embodiments, the account is a transient account (e.g., an escrow account) that is unique to the transaction and purchaser. In some embodiments, the provider computing system 120 facilitates initiation of the account via a method 300 described with respect to FIG. 3.

After the account has been initiated in step 202, then the provider computing system 120 may facilitate funding of the account in step 204. In some embodiments, the provider computing system 120 facilitates funding of the account via issuing the user with a debit card that is unique to the account. The debit card may then be used by the user at a branch (e.g., store) location or at an ATM to deposit money into the account. In some embodiments, the account is added to a dashboard in an online banking portal. The online banking portal may include a graphical user interface that displays a list of all of the user's accounts with the provider. The user may select the account from the list and choose from a plurality of methods to deposit money to the account. For example, the plurality of methods may include an option to deposit a check (e.g., via taking a picture of the check with the mobile device), transfer funds from a different existing account into the account, an option to send information regarding the account to friends. The information regarding the account may allow one or more people to selectively deposit into the account at a store location, ATM, or via an automated clearing house (ACH) transfer. In some embodiments, the information regarding the account may allow one or more people to transfer funds into the account via a peer-to-peer fund transfer platform (e.g., Zelle®, Venmo®).

The accounts circuit 124 may first generate rules associated with the account in step 204. For example, the accounts circuit 124 may generate and implement a rule that only allows deposits into the account. The accounts circuit 124 may allow a withdrawal from the account after a final date of the transaction if the transaction amount was not met. For example, if the layaway item to be purchased was $250 by a final date of March $20^{th}$, and on March $21^{st}$ the account only had $240 dollars deposited into the account, then the accounts circuit 124 may allow for the $240 dollars to be withdrawn by the purchaser because the transaction was not complete. In this example, the purchaser does not receive the item, rather receives the deposited money back. In another example, the accounts circuit 124 may generate and implement rules managing how deposits may be added to the account. In general, the rules may protect the account against fraud (e.g., by not being able to transfer money out), reduce the need for other security features such as complex verification of a user's identity, and facilitate the user to complete the layaway successfully.

In some embodiments, the rules are generated based on preferences of the merchant. The preferences of the merchant may be received in the request or stored in the accounts database 126. That is, when the seller (i.e., merchant) sets up an initial account or agreement with the provider, the preferences of the merchant may be entered and stored at that time. In some embodiments, the rules may be based on preferences of the purchaser. In one example, the preferences of the purchaser are received in the initiation request. That is, the preferences may be entered by the purchaser at the time of initiating the layaway transaction on either the customer device 110 or a terminal associated with the seller. In another example, the purchaser may manage their preferences via a graphical user interface on the customer device 110. In one example, the interface on the customer device 110 is a web browser displayed on a display of the customer device 110. In another example, the interface is a dashboard graphical user interface displayed on the customer device 110 within the client application 116. For example, FIG. 5 depicts on example of the dashboard and is discussed in detail below. Further embodiments and detailed examples of step 204 are described below, and particularly, with reference to FIGS. 4 and 5.

The provider computing system 206 finalizes the transaction in response to a condition being met in step 206. In some embodiments, the condition being met is where the funds in the account are greater than the target amount for the layaway. In this example, the provider computing system 206 may finalize the transaction by transmitting the funds in the account to an account associated with the provider (e.g., a checking or savings account of the provider) and send a confirmation notification to the user that indicates that the user can now receive the item that was laid away. In some embodiments, the condition being met is when a time deadline set at the time of account initiation has elapsed (e.g., the final date has elapsed). In some embodiments, the condition being met is when the user selects to terminate the account. In these examples, the provider computing system 206 may finalize the transaction by transferring money in the account (minus any fees) to a different account (e.g., checking or savings) of the user and notifying the user and the seller that the transaction has been canceled. In one example, the different account may have been indicated to the provider computing system 206 by the user during initiation. In another example, the user may be prompted via the provider application to select which different account that the user would prefer the providing computing system 206 to transfer remaining funds to. Further embodiments and detailed examples of step 206 are described below, and particularly, with reference to FIG. 6.

Figure 3:
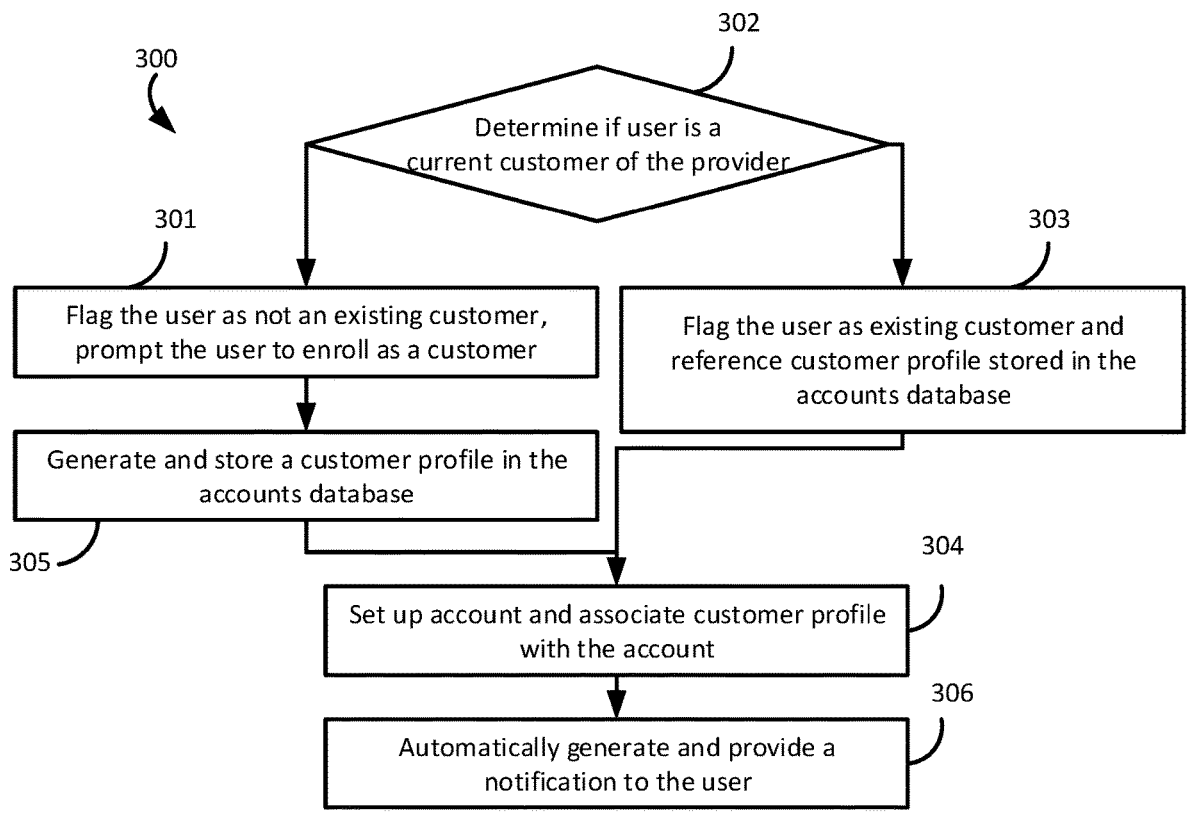
FIG. 3 depicts a method of initiating the electronic layaway transaction in accordance with an illustrative embodiment.

FIG. 3 depicts an example method 300 of automatically facilitating initiation of an account (e.g., step 202). The provider computing system 120 determines if the purchaser (i.e., user is a current customer of the financial institution) at step 302. For example, the accounts circuit 124 may utilize information in the request (e.g., the information regarding the customer) to cross reference relevant information (e.g., name and birthdate) with the accounts database 126. If the purchaser is found in the accounts database 124, then the accounts circuit 124 may flag the purchaser as an existing customer at step 304. If the purchaser is not found in the accounts database, then accounts circuit 124 may flag the purchaser as not being an existing customer at step 303. If the purchaser is not an existing customer, then the accounts circuit 124 may transmit a link or other information to the customer (via email, SMS messaging, ground mail, etc.) to prompt the user to sign into an online portal (e.g., that may be presented as a website or client application 116 on the customer device 110) in order to complete enrollment of the purchaser as a customer. In some embodiments, if the purchaser is not a customer, the accounts circuit 124 may automatically set up (e.g., enroll or on-board the purchaser as a customer) the account and create a customer profile for the purchaser based on the information received in the request (e.g., the social security number, address, birthdate, of the purchaser) at step 305.

The provider computing system 120 sets up the account and associates the user with the account at step 304. For example, the accounts circuit 124 automatically creates the account and a primary account number for the account. The accounts circuit automatically links the purchaser to the account. If the purchaser was found to be a customer (e.g., to already have been a customer in the accounts database 126), the accounts circuit 124 automatically updates the accounts database 126 for the customer to include the new account for the transaction. In this way, in this example, the existing customer (i.e., the purchaser) may sign into their accounts (e.g., their customer profile) via an online portal displayed on a web browser on the customer device 110 or sign into their accounts (e.g., their customer profile) via the customer application 116 and the new account that is unique to the layaway transaction may be automatically displayed on a dashboard on the customer device 110.

If the purchaser was not found to be a customer (e.g., the purchaser was not successfully cross-referenced in the accounts database 126), the accounts circuit 124 may create a customer profile for the purchaser based on the information regarding the customer that was received in the request. Further, the accounts circuit 124 may automatically generate the account and associated account information (e.g., primary account number) and associate the generated customer profile of the purchaser to the account at step 304.

Figure 7:
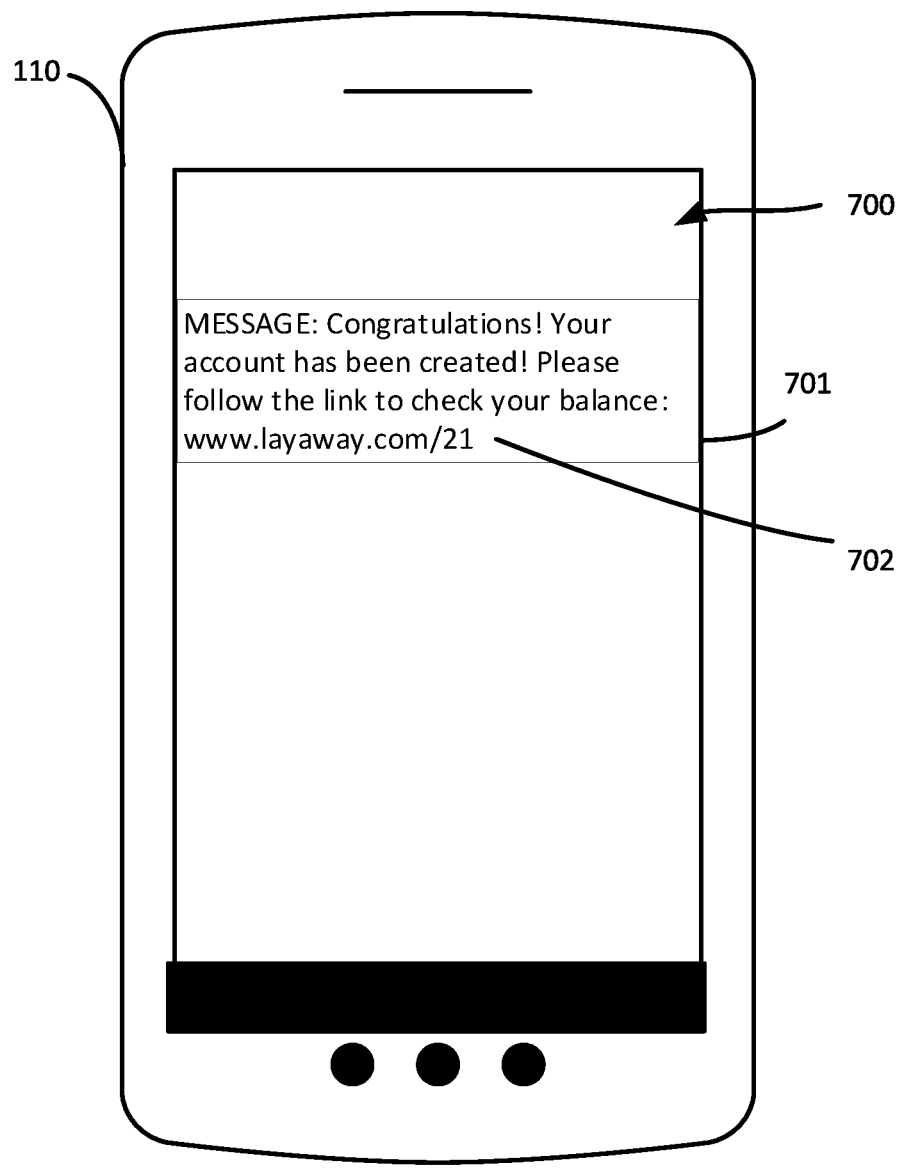
FIG. 7 depicts a graphical user interface of a communication displayed on a customer device in accordance with an illustrative embodiment.

The provider computing system 120 automatically generates a communication and provides the communication to the purchaser at step 306. In an example, the purchaser may receive the communication (e.g., via email, messaging, push notification) from the provider computing system 120 on the customer device 110. The communication may include instructions or an electronic link to set up credentials for access to the purchasers newly set up customer profile. That is, the electronic link may be selectable and re-direct the customer device 110 once selected to a page (e.g., webpage) to onboard the purchaser as an online account customer. In some embodiments, the communication simply provides the purchaser with the account information (e.g., the primary account number, routing number, brief description etc.). In some embodiments, the communication may simply notify the purchaser that the account has been generated and established. FIG. 7 depicts a graphical user interface 700 of a communication (e.g., notification) on a customer device 110 of the purchaser. The graphical user interface 700 includes a message to the user notifying the user that the account has been created. The graphical user interface 700 also includes an electronic link 702. The electronic link 702 is selectable, and when selected, may cause the customer device 110 to open a web browser and navigate to the corresponding webpage. In some embodiments, the webpage displays general information about the account (e.g., the account balance, the account goal or layaway amount, the date the balance is to be met, etc.). In some embodiments, the electronic link 702 causes the customer device 110 to open a mobile application of the provider and display the account information. In some embodiments, no additional security authentication or verification is needed in order to display the account information in response to the electronic link 702 being selected because the accounts circuit 124 can determine that the customer device 110 corresponds to the customer associated with the account (e.g., because the accounts circuit 124 sent the link to that particular customer device 110).

In some embodiments, the accounts circuit 124 may automatically generate instructions to issue a physical debit card to the purchaser. The instructions may be transmitted from the accounts circuit 124 to instruct a third part issuer of debit cards (e.g., Visa®, Mastercard®) or may be transmitted to another circuit within the provider to facilitate the issuing and sending of the physical debit card. The physical debit card is linked to the account associated with the transaction. The debit card, once received by the purchaser may have unique rules (e.g., restrictions on withdrawals unless the transaction is cancelled). As an example, and explained further below, the purchaser may use the debit card to physically go to an ATM 150 in order to deposit funds into directly into the account.

Figure 4:
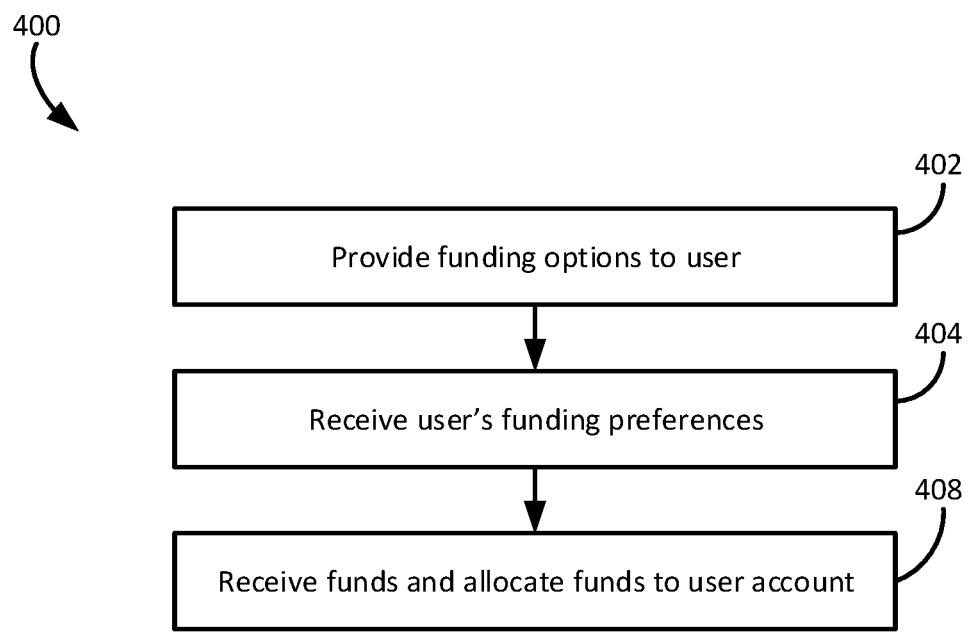
FIG. 4 depicts a method of funding an electronic layaway account in accordance with an illustrative embodiment.
Figure 5:
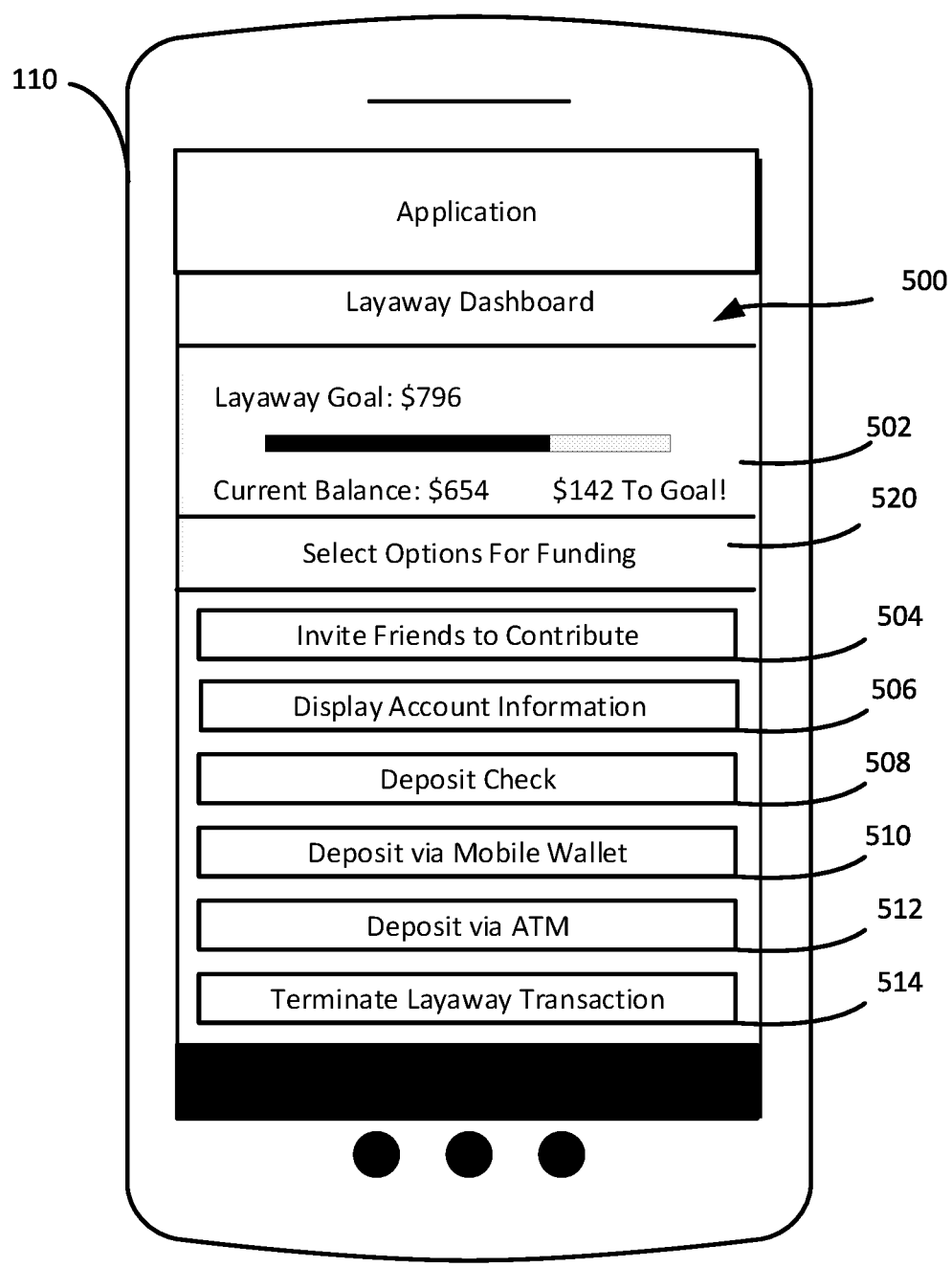
FIG. 5 depicts a dashboard displayed on a customer device in accordance with an illustrative embodiment.

FIG. 4 depicts an example method 400 of facilitating funding of the account (e.g., step 204). That is, FIG. 4 provides one example embodiment of step 204. The provider computing system 120 provides funding options to the purchaser at step 402. In some embodiments, the funding options may be presented to purchaser via the communication (e.g., email or SMS message). That is, in some embodiments, the purchaser may receive an email that includes the account number of the account along with a routing number that the purchaser may use to transfer funds into the account. In some embodiments, the customer device 110 provides the funding options. In some embodiments, the purchaser may be provided and select funding options at an ATM 150 or at a terminal provided by the seller (e.g., either online or at a store location).

For example, in some embodiments, the customer device 110 may display a plurality of funding options via a user interface. For this example, FIG. 5 is referenced for discussion purposes. FIG. 5 depicts a dashboard 500 displayed on a customer device 100 in accordance with an illustrative embodiment. In some embodiments, the dashboard 500 is displayed on the customer device 110 in response to the purchaser (i.e., user) entering their online login credentials into the client application 116 on the customer device. In other embodiments, the dashboard 500 is displayed on the customer device 110 in response to the purchaser (i.e., user) entering their online login credentials into an online portal displayed on a web browser. In alternative embodiments, the dashboard 500 may be displayed on the ATM 150, or via a web browser on any customer device 110.

In some embodiments, the dashboard 500 may include a graphical display 502. In some embodiments, the graphical display 502 may include the current amount of funds deposited into the account, a goal (e.g., transaction amount), an amount needed to reach the goal, a bar graph, a table, etc. The dashboard 500 also includes a plurality of options 520 for funding the account. Each of the options 520 may include a selectable icon that causes the customer device 110 to re-direct the purchaser to a different screen, prompt the user for more information, or to automatically communicate with the provider computing system 120.

The options 520 may include an option 504 to invite friends to contribute funds to the account. In this example, the option 504 to invite friends includes a selectable icon that, when selected re-directs the customer device 110 to a screen in which the purchaser may enter contact information of the friends they wish to invite. The contact information may include the names, emails, and/or address of each friend that the purchaser wishes to invite. The customer device 110 accepts the contact information and transmits the contact information to the provider computing system 120. The provider computing system 120 may then generate a token and request for each of the invited friends and send each of the entered friends the respective request and token. The token may be an account number unique to the primary account number and respective friend or other form of proxy for the primary account that enables each invited friend to contribute to the layaway goal without sacrificing security. That is, the tokens may be used by each respective friend to deposit money via any of the methods described herein without providing any of the friends with the primary account information. The provider computing system may then transmit the request and token to each friend requesting for each friend to contribute to the layaway purchase. A friend may then use their unique token to deposit funds and the provider computing system 120 will be able to map and allocate the deposited funds to the account.

In some embodiments, the options 520 may include an option 506 to display the account information. In this example, the option 506 to display the account information may re-direct the customer device 110 to display the account information. In some embodiments, the account information may include the account number, the routing number, the merchant information, the final date, etc. The purchaser may reference this screen in order to facilitate transactions that may not otherwise be automated by the provider computing system 120.

In some embodiments, the options 520 may include an option 508 to deposit a check. In this example, the option 508 to deposit check may be a selectable icon that when selected, re-directs the customer device 110 to display check depositing options. In one example, the check depositing option includes depositing a check via mobile deposit. In this example, the customer device 110 may automatically access a camera of the customer device 110. The customer device 110 may then be positioned adjacent to a physical check that the purchaser wishes to deposit, the camera may then capture a picture of the physical check. The picture of the physical check may then be transmitted to the provider computer 120 along with other various information entered by the purchaser or automatically generated by the customer device 110.

In some embodiments, the options 520 may include an option 510 to deposit via a mobile wallet. In this example, the purchaser may have already been enrolled in a mobile wallet application on the customer device 110. In some embodiments, the mobile wallet application is also provided by the provider. In some embodiments, the mobile wallet application is provided by other institutions. In this example, the option 510 to deposit via a mobile wallet may be a selectable icon that when selected, re-directs the customer device 110 to display the mobile wallet. The customer device 110 may auto-populate the account information to the mobile wallet. That is, the customer device 110 may be able to share the account information from the layaway dashboard into the mobile wallet application. The customer device 110 may then receive information of an amount of money to be deposited to the account, which account from the mobile wallet application that the funds are to come from, and/or a date of the transaction. The customer device 110 may then transmit the information to the provider computing system 120 that may then facilitate the transaction according the preferences (i.e., the information received on the customer device 110).

In some embodiments, the options 520 include an option 512 to deposit via an ATM. In this example, the option 512 to deposit via an ATM be a selectable icon that when selected, re-directs the customer device 110 to ATM options. In one example, the option 512 when selected automatically enables a near-field communication (NFC) circuit on the customer device 110. The customer device 110 may then be placed near and ATM 150 that also has a near-field communication circuit (NFC). The ATM 150 may react in response to the customer device 110 being placed near the ATM 150. That is, there may be a communication, handshake, and/or exchange of data between the customer device 110 and the ATM 150. The ATM 150 may then automatically populate a user interface on a display of the ATM 150 to signal to the purchaser what exchange of data between the customer device 110 and the ATM 150 occurred. In one example, the purchaser may select on the customer device 110 preferences to deposit a specific amount (e.g., $50) into the account and also select where the funds are to come from. For example, the purchaser may indicate on that the purchaser has cash to deposit. In this example, the customer may enter the amount via the user interface of the customer device 110 or a user interface of the ATM 150 and deposit the cash into a holding or cash repository located on or around the ATM 150. The ATM 150 and/or the customer device 110 may then auto generate a confirmation of funds received. The confirmation may be displayed on the ATM 150, displayed on the customer device, and/or transmitted to the provider computing system 120. In another embodiment, the specific amount funds may be in check form (e.g., the customer signs the check and physically places it into the repository which may scan the check).

In another embodiment, the ATM 150 may not interact with customer device 110. Rather, in an example, the purchaser may enter into the user interface of the ATM 150 the account information. In another example, the purchaser may have a unique card that is unique to the account that can be swiped, tapped, or dipped at the ATM 150 to signal to the ATM 150 which account the deposit is to be allocated to. Thus, the specific rules of the account enhance security and reduce friction for the purchaser to save for the transaction. That is, the ATM 150 needs less security protocols because of the rule that the account may only be deposited to. In other words, the ATM 150 may simply be able to accept typed-in (via a keypad on the ATM 150) account information because the rules prevent withdrawals from the account until specific instructions are received to remove the rule.

In some embodiments, the purchaser may use a debit card not associated with the account at the ATM 150 to deposit funds into the account. For example, the purchaser may have initiate access of the account via the ATM 150 by the NFC communication explained above or by entering in the account information into the ATM 150, then the ATM 150 may automatically prompt the purchaser which deposit option the purchaser would like to use. The deposit options may include an option to use the debit card not associated with the account to transfer funds from the debit account to the account. The purchaser may then swipe, dip, or tap the debit card not associated with the account, enter a pin number, and select the amount of funds (e.g., via entering on the ATM 150) to transfer. The ATM 150 may then transmit the information associated with the deposit option to the provider computing system 120. The provider computing system 120 may then facilitate performance of the selected option 512.

In some embodiments, the options 520 include an option 514 to terminate the layaway transaction. In this example, the option 514 is a selectable icon that, once selected, causes the customer device 110 to prompt the purchaser whether they would actually like to terminate the layaway transaction. The prompt may include a selectable "Yes" icon and a selectable "No" icon. The prompt may also information including an amount that will be lost in fees if the layaway transaction is cancelled. In one particular example, if the purchaser then selects "Yes" the customer device 110 may transmit a notification of the selected option for termination to the provider computing system 120 and/or the merchant computing device 140. The provider computing system 120 may then facilitate performance of the selected option 514.

The funding preferences are received by the provider computing system 102 from the customer device 110 via the selection of options 502-514 as explained herein at step 404. In some embodiments, the funding preferences are automatically generated via the preferences entered at time of enrollment of the purchaser or agreement between the provider and the seller. In some embodiments, the funding preferences are received from the merchant computing system 140. In some embodiments, as explained above, the funding preferences are based on received information from the ATM 150.

The provider computing system 120 receives funds and allocates the funds to the account at step 408. In some embodiments, the provider computing system 120 receives a deposit with a unique account number via an ACH transfer and automatically adds the funds to the respective account. In some embodiments, the provider computing system 120 receives incoming requests with unique tokens, account number, or other identification numbers and automatically allocates the incoming funds to the account (i.e., the layaway transient account). In some embodiments, the request to initiate the account includes an indication of how much the purchaser has already given to the merchant as a down payment. In some embodiments, the request to initiate the account includes an incoming fund amount that is the down payment of the layaway transaction. The down payment amount may be automatically allocated (e.g., credited) to the account by the provider computing system 120.

Figure 6:
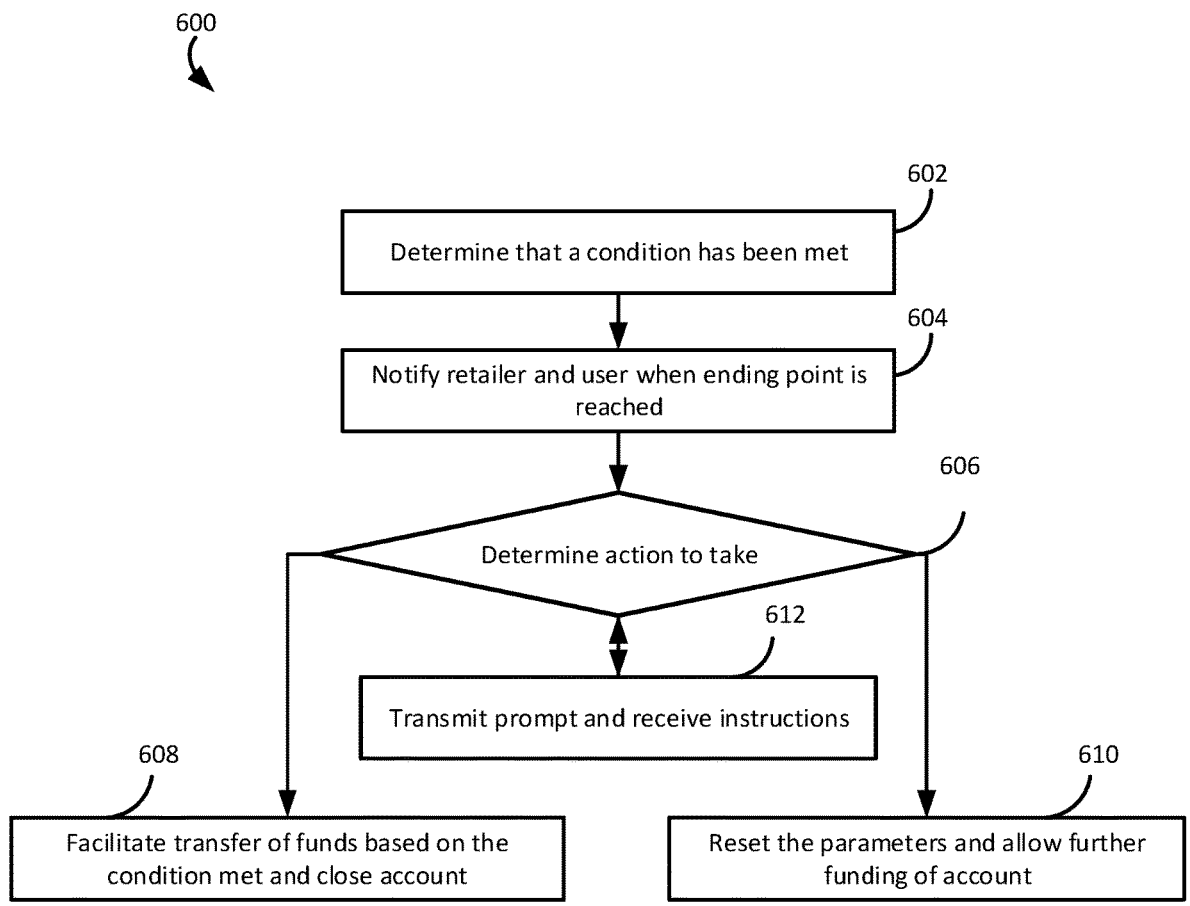
FIG. 6 depicts a method of finalizing an electronic layaway transaction in accordance with an illustrative embodiment.

As discussed above, and referring generally back to FIG. 2, the provider computing system 120 finalizes the transaction in response to a condition being met at step 206. In one example, step 206 is explained in reference to FIG. 6. That is, FIG. 6 is one particular method 600 of finalizing the transaction in response to a condition being met. The provider computing system 120 (e.g., accounts circuit 124) determines that a condition has been met at step 602. In some embodiments, the condition met is that the account has sufficient funds to pay for the item purchased via layaway (e.g., the amount of funds in the account is equal to or exceeds the layaway goal). In some embodiments, the condition met is the passage of the final date. In some embodiments, the condition met is a request received by the provider computing system 120 from the purchaser or the seller to terminate the layaway transaction.

The provider computing system 120 generates and transmits a notification intended to notify the purchaser and seller at step 604. In some embodiments, the notification is generated and transmitted to the customer device 110, which may then be displayed on the display of the customer device. In some embodiments, the notification is generated and transmitted to the ATM 150, which then displays the notification to the purchaser at the ATM 150. In some embodiments, the notification is generated and transmitted to the merchant computing device 140.

The notification signals to the purchaser and the seller that the condition has been met. The provider computing device 120 may then determine an action to take in step 606. In some embodiments, the action includes facilitating the transfer of funds automatically in response to a particular condition being met in step 608 (e.g., automatically transfer the funds to the merchant in response to the layaway condition being met). In some embodiments, the action includes not transferring funds and resetting the account such that the account allows for further funding and the provider computing system 120 waits for another condition to be met in step 608. In some embodiments, the action includes prompting the user and/or the merchant in order to request instructions and the instructions are received by the provider computing system 120 in step 612. The provider computing system 120 may then determine an action to take based on the instructions at step 606 again. For example, depending upon the condition met, the provider computing system 120 may transmit a prompt to the user (e.g., via the customer device 110 or ATM 150) and/or transmit a prompt to the merchant (e.g., via the merchant computing system 140) requesting instructions. The instructions may indicate that the electronic layaway transaction should continue (e.g., and the action should be step 610) or the instructions may indicate that the electronic layaway transaction should end (e.g., and the action is step 608). For example, the provider computing system 120 may prompt the user (e.g., via the customer device 110 or ATM 150) whether they would like to cancel the electronic layaway transaction. If the user confirms the cancellation of the electronic layaway transaction, the provider computing system 120 facilitates the transfer of funds from the account (minus any fees) and, in some embodiments, closes the account (e.g., step 608).

In one example, where the condition met is that the final date has been reached, the provider computing system 120 may need instructions to determine which action to take. Thus, in this example, the notification to the customer device 110 may include a prompt. The prompt may include selectable icons that are displayed on the either a display of the customer device 110 or the ATM 150 that prompts the purchaser whether the purchaser would like to request for more time to save. If the customer selects the icon to request for more time, the customer device 110 may then transmit the selection to the financial computing system 120 and the provider computing system 120 may then generate and transmit a request (e.g., prompt) to the merchant computing system 140 for an extension of time. The merchant computing system 140 may then determine whether an extension is permissible and transmit in response an answer to the request. The answer includes instructions to the provider computing system 120. For example, if the answer to the request is that the extension is permissible, then the provider computing system 120 may send a notice that the extension of time has been permitted to the customer device 110 (e.g., via a push notification, email, message) or ATM 150 (e.g., displayed during the purchaser's session at the ATM) and proceed to step 610. In this example, the parameters that would be reset in step 610 include resetting (e.g., updating) the final date to the extended final date The provider computing system 110 then begins waiting for another condition to be met. In another example, if the answer to the request is that the extension is not permissible, then the provider computing system 110 may send a notification to the customer device 110 or ATM 150 that the request was rejected and the action is determined to proceed to step 608. In one example, the provider computing system 120 may facilitate the transfer of funds by sending an indication to the customer device 110 that the purchaser may withdraw the deposited funds from the account minus the fees indicated per any pre-transaction agreements.

In some embodiments, in another example, where the condition met is that the funds deposited into the account have equaled or exceeded the purchase price of the item (i.e., the layaway goal), the notification may include instructions to the purchaser to pick up the item and the action may be determined to proceed to step 608. In some embodiments, the notification includes a code (e.g., a bar code, QR code, numeric code.) that can be displayed on the customer device 110. The code may then be used by an employee at a retail location of the seller in order for the purchaser to receive the item. In another example, the code may be entered into an online website of the merchant in order for the merchant to release the layaway item and ship the item directly to an address entered by the purchaser or the merchant. In some embodiments, the notification may simply indicate that the deposited funds have reached the layaway goal and that the item is released for delivery from the seller. In some embodiments, the provider computing system 120 generates and transmits a notification to the merchant computing system 140 information regarding the code. In some embodiments, the provider computing system generates and transmits a notification to the merchant computing system 410 that indicates that the funds deposited meet or exceed the layaway goal in order to release the item from the store. The notification to the merchant may include information such as a selected preference (e.g., preference selected in the dashboard 500 or selected by the purchaser on the notification to the purchaser) of the purchaser to have the item shipped directly to an address.

The provider computing system 120 facilitates transfer of funds in response to instructions to finalize at step 608. In some embodiments, the provider computing system 120 may allow the purchaser to have a one-time withdrawal of the funds from the account. For example, if the deposits in the account were insufficient to pay for the layaway item before the final date, then the purchaser may have permission to withdraw all of the funds (e.g., deposited funds minus fees) from the account. The purchaser may visit a branch (e.g., brick and mortar store location) of the provider to withdraw the funds, visit an ATM 150 with authentication via the customer device 110 (e.g., via NFC technology described above) or debit card, or transfer the funds via the dashboard 150 on the customer device 110 to a checking or savings account of the customer or transfer via a peer-to-peer service (e.g., Zelle®) offered by the provider.

In some embodiments, the provider computing system 120 may transfer the funds in the account to the merchant. In some embodiments, the provider computing system 120 waits for confirmation from the merchant computing system 140 that the purchaser has indeed picked up the layaway item from a retail location or requested that the merchant ship the item directly to the purchaser. In other embodiments, the provider computing system 120 transfers the funds in the account upon the condition being met. For example, if the deposits in the account were sufficient to pay for the layaway item before the final date, then the provider computing system 120 may transfer of the funds in the account to the merchant. In some embodiments, the transfer of funds in the account is made internally to a checking or savings account of the merchant. In some embodiments, the transfer of funds in the account are made to an external checking or savings account of the merchant. The exact location of the transfer of funds to the merchant may be determined at the time that the merchant and the provider agree to the provider facilitating layaway transactions. For example, the merchant, upon entering an agreement to have the provider facilitate layaway transactions, may have a variety of preferences and fee arrangements with the provider that are entered into the provider computing system 120. The provider computing system 120 may then automatically facilitate transfers of funds from the account (e.g., minus fees collected by the provider) to the preferred accounts of the merchant.

In some embodiments, the funds in the account exceed the amount of the layaway transaction (e.g., the layaway goal). In this example, the provider computing system 120 may automatically facilitate the transfer of funds equal to the layaway transaction to the merchant and allow the purchaser to withdraw the remaining funds via any of the methods described above. That is, the rules associated with the account may instruct the provider computing system 120 to facilitate transfer of funds from the account to the merchant and purchaser such that the account balance is zero after all fees and transactions for the layaway item are completed. In some embodiments, the provider computing system 120 may delete the account once all funds have been removed. That is, the accounts circuit 124 may delete the account and related information from the accounts database 126 after the transaction has been finalized and all funds have been removed. In some embodiments, the accounts circuit 124 may also delete the customer profile of the purchaser in response to the account being closed and/or deleted.

Figure 8:
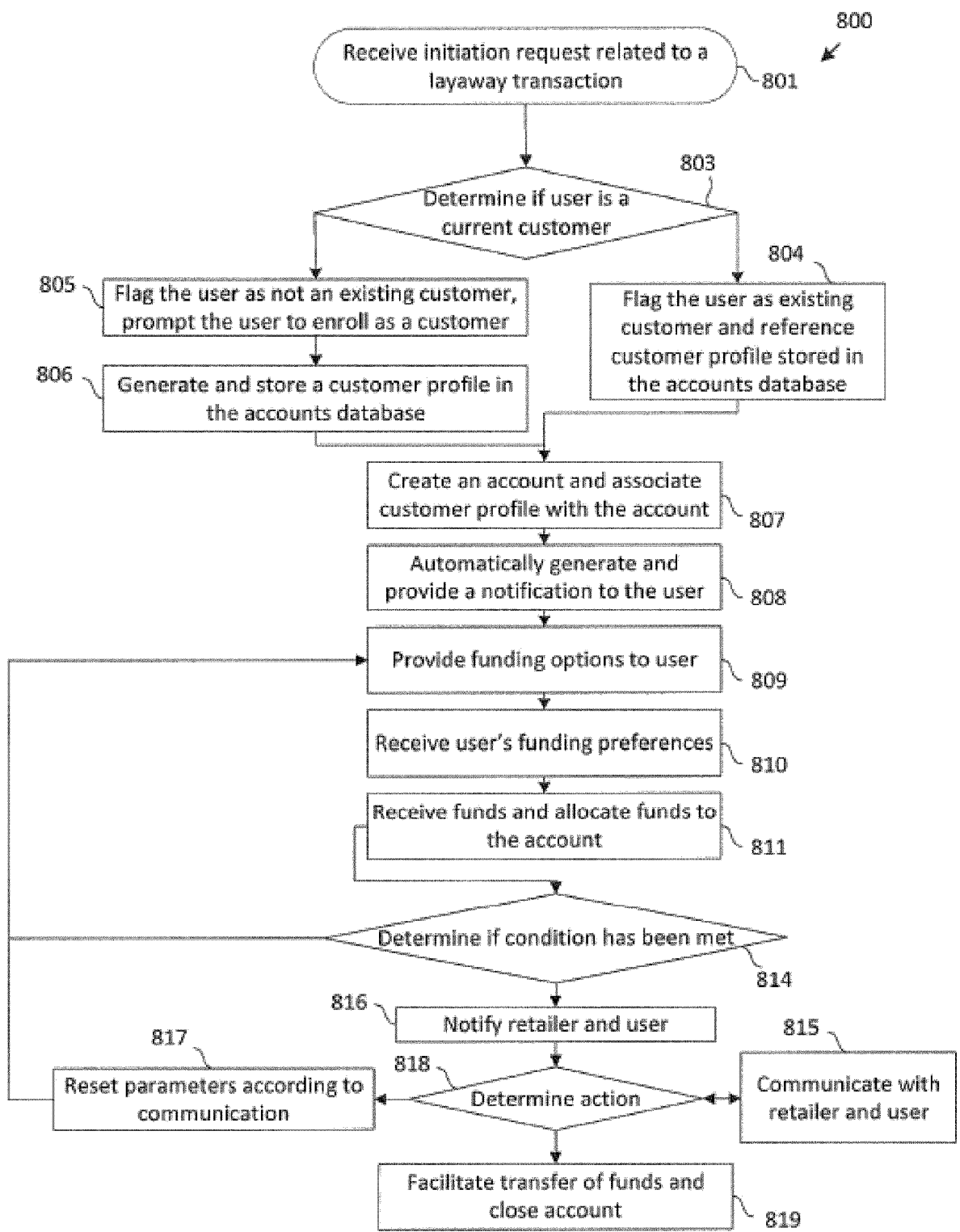
FIG. 8 depicts a method of facilitating electronic layaway transactions in accordance with an illustrative embodiment.

FIG. 8 depicts method of facilitating electronic layaway transactions 800 in accordance with an illustrative embodiment. The steps of the method of facilitation electronic layaway transactions 800 may be performed by the provider computing system 120. In particular, FIG. 8 depicts one particular example of the provider computing system 120 providing and facilitating the electronic layaway transaction. It is to be appreciated that in other embodiments more or less steps may be incorporated.

The provider computing system 120 receives an initiation request related to a layaway transaction in step 801. In some embodiments, the initiation request is received from the merchant computing system 140 in response to the merchant computing system 140 receiving a request from a user to purchase an item via an electronic layaway transaction. In some embodiments, the initiation request may be received via a terminal within the provider computing system 140 in response to a user entering information to begin an electronic layaway transaction. In some embodiments, the initiation request includes the name of the merchant, the name of the user (e.g., purchaser), account information of the merchant, existing account information of the user, an address of the user, a birth date of the user, or other identity information of either the user or the merchant. In some embodiments, the initiation request also includes an amount of the transaction and a final date of the transaction (e.g., parameters) agreed upon between the user and the merchant.

The provider computing system 120 determines whether the user is a current customer of the provider in step 803. In one example, the provider computing system 120 determines whether the user is a current customer by cross-referencing the user (e.g., information received in the initiation request) in the accounts database 126. If the user is not a customer, the provider computing system 120 flags the user as not an existing customer and prompts the user to enroll as a customer in step 805. Once the provider computing system 120 receives information to enroll the user as a customer, the provider computing system 120 generates and stores a customer profile in the accounts database 126. The information to enroll may include the user's name, address, social security number, associated accounts, phone number, etc. In some embodiments, the provider computing system 140 may automatically create a customer profile for the user based on the information received in the initiation request rather than prompt the customer to do so. In some embodiments, the customer profile may be created by creating an object in an object oriented coding software and populating the fields of the object with the received information to enroll. The object and fields of the object may then be stored in memory (e.g., the accounts database) as a result of the code. If the user is a customer, the provider computing system 120 may flag the user as an existing customer and retrieve the user's customer profile from the accounts database 126 in step 804. In this example, the accounts circuit 124 may access the customer profile in the memory via code that calls upon an object in an object associated with the customer profile in an oriented coding platform.

After the customer profile has either been generated in step 806 or accessed in step 804, the provider computing system 120 may create an account for electronic layaway and associate the account with the customer profile with the account in step 807. In some embodiments, the account is created by the accounts circuit 124. The accounts circuit 124 may perform a series of actions that creates a unique payment account number (PAN) for the account and store the unique PAN in the accounts database 126. In some embodiments, the accounts circuit 124 may associate the customer profile with the created account by cross-referencing customer profile with the account. In some embodiments, the accounts circuit 124 may associate the customer profile with the created account by storing information of the account (e.g., the PAN) within the object of customer profile in an object oriented coding platform. Similarly, the accounts circuit 124 may associate the customer profile with the account by storing information (e.g., an identifier in code or the user's name) within the object of the account in an object oriented coding platform. In response to the successful facilitation of creating the account and associating the customer profile to the account, the provider computing system 120 may automatically generate and provide a notification to the user in step 808. The notification may notify the user that the account has been created and that the user has been associated with the account. In some embodiments, notification may serve as a layer of security. For example, the notification may serve to notify a user of the creation of the account and if the account was created or requested as a result of a fraudulent actor, then the user can remedy the situation once the user is notified via the notification. One example of such notification is referenced above in reference to FIG. 7.

The provider computing system 120 then provides funding options to the user in step 809. As referenced above, the provider computing system 120 may provide multiple options and/or methods to the user for funding the account. For example, as referenced in FIG. 5, the provider computing system 120 may provide the user with an online dashboard that enables the user to select how they would prefer to fund the account. Further, in some embodiments, the providing computing system 120 may automatically issue a debit card to the user for the user to use at an ATM 150 in order to add funds to the account. In some embodiments, the provider computing system 120 may also generate and send a notification to the user that gives the user the PAN and routing number. The PAN and routing number may then be used by the user to send funds to the account via an automated clearing house (ACH) or other form of electronic funds transfer. The provider computing system 120 receives funding preferences from the user at step 810. In some embodiments, the provider computing system 120 receives the funding preferences from the customer device. The provider computing system 120 receives funds and allocates funds to the users account in step 811. In some embodiments, the provider computing system 120 may receive funds from other institutions (e.g., banks, credit cards, etc.) and allocate the funds to account. In some embodiments, such as when the funding preferences indicate that the user would like to transfer money from an existing account (e.g., checking or savings) with the provider to the account, the provider computing system 120 may internally allocate funds from the customer's existing account to the account. Technically and advantageously, this may provide security to the account and the user because the account is only able to receive funds at this step of the method.

The provider computing system 120 then determines whether a condition has been met at step 814. In some embodiments, the provider computing system 120 includes code that causes the provider computing system 120 to check for a list of conditions and whether they are met each day. In some embodiments, the provider computing system 120 automatically checks whether one or more conditions has been met in response to the provider computing system 120 completing step 811. In some embodiments, the condition being met may be that the final date has passed (the present date is at or later than the final date received in the initiation request). In some embodiments, the condition being met may be that the amount of funds allocated to the account is greater than the transaction amount. If a condition has not been met, the provider computing system 120 proceeds back to step 809 and continues to provide funding options to the user. If a condition has been met, the provider computing system 120 proceeds to notify the merchant and user at step 816. The provider computing system 120 determines an action to take at 818 based on the condition met. If the condition met requires instructions from the user and merchant before determining an action, the provider computing system 120 communicates with the merchant and/or user at step 815. In some embodiments, the provider computing system 120 communicates with the merchant and/or user via sending a message or notification (e.g., to the merchant computing system 140 or the customer device). The message may prompt the merchant or user to respond to the provider computing system 120 (or an agent of the provider, who may then enter the response data into the provider computing system 120) as to the action that should be taken by the provider computing system 120 in response to the condition being met. Particular examples are referenced and discussed above in reference to FIG. 6. The provider computing system 120, in response to determining the action in step 814, then either proceeds to facilitate the transfer of funds in the account and close the account in step 819 or to reset one or more parameters of the electronic layaway transaction in response to instructions received by the provider computing system 120 at step 815. In this way, the provider computing system 120 is able to enable the facilitation of an electronic layaway transaction via a secure, reliable, and efficient platform.

The embodiments described herein have been described with reference to drawings. The drawings illustrate certain details of specific embodiments that implement the systems, methods, and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the terms "circuit" and/or "computing system" may include hardware structured to execute the functions described herein. In some embodiments, each respective "circuit" and/or "computing system" may include machine-readable media for configuring the hardware to execute the functions described herein. The circuit may be embodied as one or more circuitry components including, but not limited to, processing circuitry, network circuits, peripheral devices, input devices, output devices, and sensors. In some embodiments, a circuit may take the form of one or more analog circuits, electronic circuits (e.g., integrated circuits (IC), discrete circuits, system on a chip (SOCs) circuits), telecommunication circuits, hybrid circuits, and any other type of "circuit" and/or "computing system." In this regard, the "circuit" and/or "computing system" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on).

The "circuit" and/or "computing system" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc. In some embodiments, the one or more processors may be external to the apparatus, for example, the one or more processors may be a remote processor (e.g., a cloud-based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud-based server). To that end, a "circuit" and/or "computing system" as described herein may include components that are distributed across one or more locations.

An exemplary system for implementing the overall system or portions of the embodiments might include general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input device," as described herein, may include any type of input device or input devices including, but not limited to, a keyboard, a keypad, a mouse, joystick, or other input devices capable of performing a similar function. Comparatively, the term "output device," as described herein, may include any type of output device or output devices including, but not limited to, a computer monitor, printer, facsimile machine, or other output devices capable of performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps, and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described to explain the principals of the disclosure and its practical application to enable one skilled in the art to utilize the various embodiments and with various modifications as are suited to the particular use contemplated. Other substitutions, modifications, changes, and omissions may be made in the design, operating conditions, and arrangement of the embodiments without departing from the scope of the present disclosure as expressed in the appended claims

What is claimed is:

1. A method of facilitating a layaway transaction between a merchant and a user, the method comprising:
   receiving, via a processor of a provider computing system from a merchant computing system, an initiation request related to a transaction, wherein the initiation request comprises transaction information, user information, and a final date;
   in response to receiving the initiation request, automatically facilitating, by the processor, initiation of a layaway deposit account, wherein the layaway deposit account is unique to the transaction and wherein initiation of the layaway deposit account comprises:
      generating rules that govern the deposits and withdrawals of the layaway deposit account; and
      associating the rules with the layaway deposit account;
   facilitating, via the processor of the provider computing system, funding of the layaway deposit account, comprising:
      receiving, by the processor from an automated teller machine (ATM), funding information comprising a funds deposit amount, wherein the funds deposit amount complies with the rules associated with the layaway deposit account; and
      allocating, via the processor, the funds deposit amount to the layaway deposit account; and
   finalizing, via the processor, the transaction by releasing funds in the layaway deposit account to a merchant account.

2. The method of claim 1, wherein automatically facilitating initiation of the layaway deposit account comprises:
   determining, via the processor, based on the user information that the user is a current customer of a provider associated with the provider computing system;
   generating, via the processor, the layaway deposit account and an account number associated therewith;
   associating the layaway deposit account with a customer profile of the user; and
   automatically generating a notification that is configured to notify the user of the generated layaway deposit account and the account number associated therewith.

3. The method of claim 1, wherein automatically facilitating initiation of the layaway deposit account comprises:
   determining, via the processor, that the user is not a current customer of a provider associated with the provider computing system;
   generating, via the processor, the layaway deposit account and an account number associated therewith;
   automatically generating, via the processor, a new customer profile for the user; and
   associating the layaway deposit account with the new customer profile;
   automatically generating a notification that is configured to notify the user of the generated layaway deposit account, the account number associated therewith, and the new customer profile.

4. The method of claim 1, wherein facilitating funding of the layaway deposit account comprises:
   providing, via the processor, funding options to a user device associated with the user;
   receiving, via the processor and from the user device, a designation of funding preferences based at least in part on the provided funding options;
   facilitating, via the processor, the designated funding preferences;
   receiving, via the processor, funds for the layaway deposit account; and
   in response to receiving the funds, automatically allocating the funds to the layaway deposit account.

5. The method of claim 1, wherein facilitating funding of the layaway deposit account comprises:
   determining, via the processor, that the merchant received a down payment from the user;
   automatically funding the layaway deposit account with an amount of funds equal to the down payment.

6. The method of claim 1, wherein facilitating funding of the layaway deposit account comprises:
   receiving, via the processor, funds for the layaway deposit account; and
   in response to receiving the funds, automatically adding the funds to the layaway deposit account.

7. The method of claim 1, wherein finalizing the transaction comprises determining, by the processor, that a condition has been met.

8. The method of claim 7, wherein the condition is that the final date has been reached, and wherein an amount of funds in the layaway deposit account are returned to the user minus a previously agreed-upon service fee, the previously agreed-upon service fee being released to the merchant account.

9. The method of claim 8, wherein the amount of funds in the layaway deposit account is transferred to a checking account of the user.

10. The method of claim 7, wherein the condition is that the amount of funds in the layaway deposit account are sufficient for the transaction.

11. The method of claim 1, wherein automatically facilitating initiation of the layaway deposit account comprises:
    generating the layaway deposit account and an account number associated therewith.

12. The method of claim 1, wherein facilitating funding of the layaway deposit account comprises:
    receiving, by the processor, a request to invite a first person and a second person to contribute to the layaway deposit account, wherein the request comprises contact information for the first person and the second person;

generating, by the processor, a first token for the first person and a second token for the second person; and transmitting, by the processor, the first token to the first person according to the contact information of the first person and the second token to the second person according to the contact information of the second person.

13. The method of claim 12, wherein the first token is a first proxy for the layaway deposit account and the second token is a second proxy for the layaway deposit account.

14. The method of claim 12, wherein facilitating funding of the layaway deposit account further comprises:

receiving, via the processor, funds associated with the first token; and allocating, via the processor, the funds associated with the first token to the layaway deposit account.

15. A non-transitory computer readable media having computer-executable instructions embodied therein that, when executed by at least one processor of a provider computing system, cause the provider computing system to perform operations to facilitate a layaway transaction between a merchant and a user, the operations comprising:

receiving, from a merchant computing system, an initiation request related to a transaction, wherein the initiation request comprises transaction information, user information, and a final date;

in response to receiving the initiation request, automatically facilitating initiation of a layaway deposit account, wherein the layaway deposit account is unique to the transaction and wherein initiation of the layaway deposit account comprises:

generating rules that govern the deposits and withdrawals of the layaway deposit account; and associating the rules with the layaway deposit account;

facilitating funding of the layaway deposit account, comprising:

receiving, from an automated teller machine (ATM), funding information comprising a funds deposit amount, wherein the funds deposit amount complies with the rules associated with the layaway deposit account; and allocating the funds deposit amount to the layaway deposit account; and finalizing the transaction by releasing funds in the layaway deposit account to a merchant account.

16. The non-transitory computer readable media of claim 15, wherein the computer-executable instructions, when executed by at least one processor of the provider computing system, cause finalizing the transaction to comprise a determination that a condition has been met.

17. The non-transitory computer readable media of claim 16, wherein the condition is that the final date has been reached, and wherein the computer-executable instructions, when executed by at least one processor of the provider computing system, cause an amount of funds in the layaway deposit account to be returned to the user minus a previously agreed-upon service fee, the previously agreed-upon service fee being released to the merchant account.

18. The non-transitory computer readable media of claim 16, wherein the condition is that the amount of funds in the layaway deposit account are sufficient for the transaction.

* * * * *